United States Patent [19]

White et al.

[11] 4,117,775

[45] Oct. 3, 1978

[54] TYING NEEDLE SAFETY CONTROL FOR CROP BALERS

[75] Inventors: Allen A. White, Peabody; George Yatcilla; Cecil L. Case, both of Newton, all of Kans.

[73] Assignee: Hesston Corporation, Hesston, Kans.

[21] Appl. No.: 795,616

[22] Filed: May 10, 1977

[51] Int. Cl.² ............................................. B65B 13/08
[52] U.S. Cl. .................................................. 100/19 R
[58] Field of Search ................ 100/4, 19 R, 19 A, 53; 56/453

[56] References Cited

U.S. PATENT DOCUMENTS

| | | | |
|---|---|---|---|
| 1,671,966 | 6/1928 | Burkholder | 100/19 R |
| 2,604,844 | 7/1952 | Hill | 100/19 R |
| 2,760,429 | 8/1956 | Skromme | 100/19 R |
| 2,780,164 | 2/1957 | Schaaf | 100/19 R |

FOREIGN PATENT DOCUMENTS 470,279  8/1975  U.S.S.R. ................ 100/19 R

*Primary Examiner*—Billy J. Wilhite
*Attorney, Agent, or Firm*—Schmidt, Johnson, Hovey & Williams

[57] ABSTRACT

In the event that tying needles should be left in the path of travel of the baling plunger as a result of a malfunction in the drive for the needles, a safety control linkage will take over to withdraw the needles from the path of travel as the plunger continues in operation. During the baling process and before initiation of a tying cycle, the linkage reciprocates freely without effect on the tying needles as a result of a lost-motion connection therewith. The relationship between the linkage and the needles is such that the linkage has no effect on the needles when the latter are swung into operation by their driving mechanism, the linkage only coming into play if such mechanism should fail and be thus unable to withdraw the tying needles in the normal manner.

9 Claims, 4 Drawing Figures

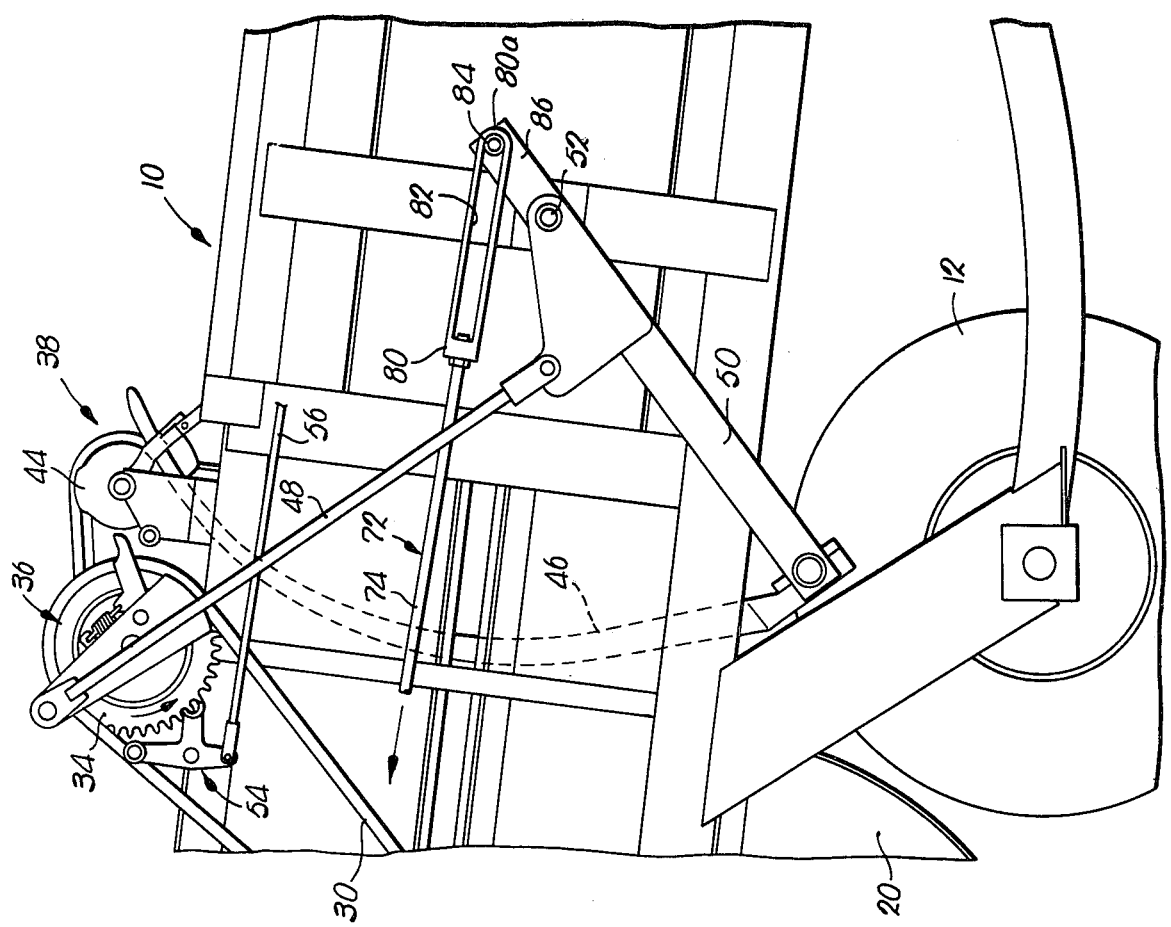
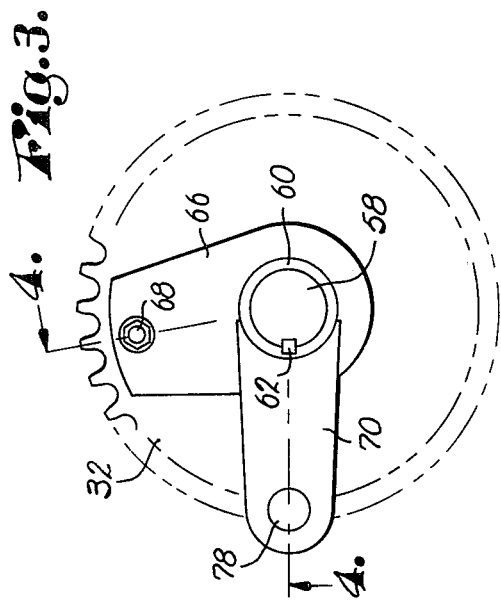
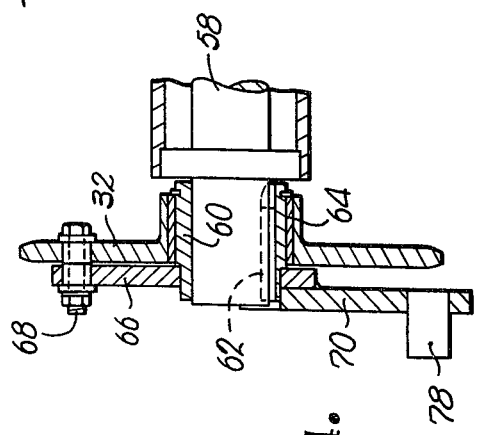

TYING NEEDLE SAFETY CONTROL FOR CROP BALERS

This invention relates to protecting the plunger and tying needles of a baler against damage to either or both of such structures in the event that the drive mechanism for the needles should fail during a tying cycle, and thus leave the needles within the bale case instead of retract them fully therefrom as intended. While the plungers of crop balers of the type herein contemplated are normally provided with slotted faces to clear the tying needles during their movement back and forth across the bale chamber, the danger of breakage does not derive from the plunger itself, but rather from any additional charge of crop material that might be loaded into the chamber between the plunger and the needles. In that event, the slots are blocked by the new charge of material and the needles become either severely bent or broken by compaction of the charge against the needles.

Typical measures for avoiding such damage to the needles have included various types of stops which operate to abruptly block further movement of the plunger in the event that the needles are not safely out of the bale chamber. These arrangements, however, depend upon the ability of such positive stops to overcome the momentum of their plungers, and where such plungers are relatively massive, the ability of such structures to successfully bring the big plungers to an immediate halt comes into question. Moreover, even if the plunger is successfully stopped, the shock to various components of the system can be so great that serious damage can result on a scale equal to or greater than that otherwise incurred by the needles.

Accordingly, one important object of the present invention is to forego any efforts to stop the plunger in favor of efforts to withdraw the tying needles in those instances where the malfunctioned drive for such needles would otherwise leave them precariously within the bale chamber. Stated differently, instead of stopping the plunger, it is an important object of the present invention to provide a way of withdrawing the needles notwithstanding failure of the normal drive mechanism therefor.

Pursuant to the foregoing, another important object of this invention is to provide an auxiliary source of withdrawing force for the needles that never interferes with the needles when the latter are in an idled, standby condition or are operating properly within a tying cycle, and yet is ever presently available for immediate employment in the event of a malfunction.

More specific important objects of the present invention include the provision of an auxiliary operating linkage independent of the normal drive means for the needles that is shifted through a prescribed cycle of operation during each reciprocation of the plunger so as to be in position to take over for the drive means and withdraw the needles from the bale chamber in the event that the drive means become inoperative for this purpose, such linkage having a lost-motion connection with the needles in such a way that the linkage has no effect on the needles unless they are out of position with respect to their normal relationship to the various components of the baler.

A further important object of this invention is to provide the drive train for the tying needles with a predetermined relief point that is calculated to disconnect the needles from their ultimate source of driving power before other components of the baler can incur serious damage as a result of excessive loading placed on the needles.

In the drawings:

FIG. 2 is a fragmentary elevational view of a localized part of such baler illustrating the manner in which the needle safety employed therewith is operable to withdraw the needles from the bale chamber;

FIG. 3 is an enlarged fragmentary elevational view of components associated with the drive for the needles; and FIG. 4 is a fragmentary cross-sectional view thereof taken along line 4—4 of FIG. 3.

Figure 1:
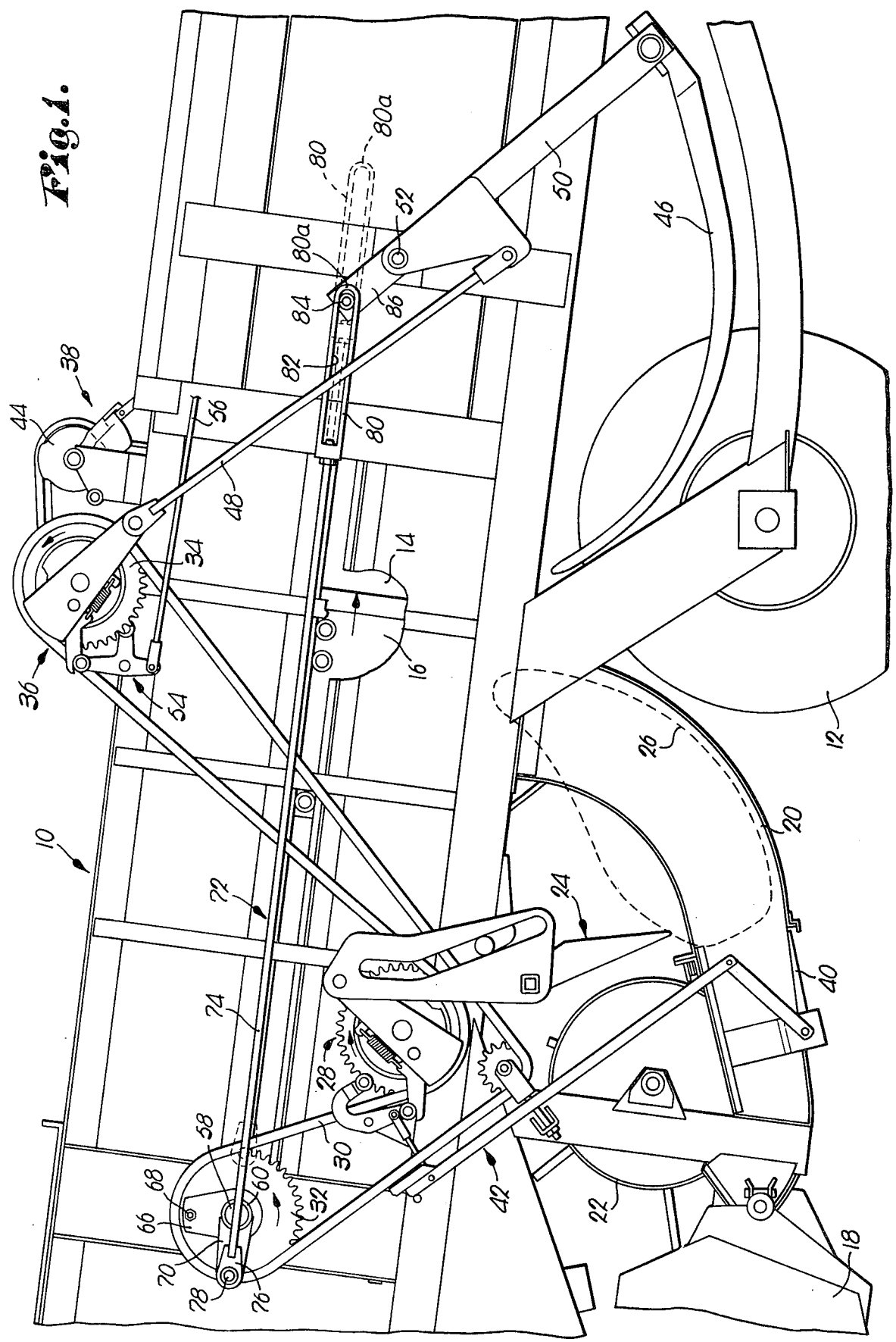
FIG. 1 is a fragmentary side elevational view of a baler employing the principles of the present invention.

Before entering into a detailed description of the present invention, it should be pointed out that many of the principles herein described and claimed are applicable to alternative types of apparatus for binding a finished bale, e.g., wire "twisting" apparatus and twine "tying" apparatus. Accordingly, it is to be understood that the references heretofore and hereinafter made to "tying needles" and the like is not intended to be taken in the sense that such terms are limited only to twine tying apparatus. Rather, such language is utilized by way of example only and for purposes of rendering the subject matter more easily understandable.

The baler as depicted in the drawings has an elongated, fore-and-aft extending bale case 10 supported for over-the-ground travel by ground wheels 12 (only one being illustrated). The bale case 10 is, of course, hollow, defining an interior bale chamber 14 (fragmentarily illustrated) within which a plunger 16 reciprocates in a fore-and-aft direction. Crop materials are lifted off the ground by a suitable pickup 18 upon advancement of the bale case 10, and such materials are packed rearwardly from the pickup 18 into an upwardly curved duct 20 by a rotary, retracting finger drum 22 at the lower end of the duct 20. The upper end of the duct 20 communicates with the bale chamber 14 via an inlet not illustrated, and a stuffing fork 24 periodically enters the duct along the dotted line path of travel designated by the numeral 26 to sweep accumulated material upwardly through the duct 20 and into the chamber 14.

Details of the construction and operation of the foregoing components are not particularly germane to the principles of the present invention and will thus not be further discussed here. Additional details may be obtained through reference to copending application Ser. No. 675,475, titled "Crop Density Sensing Mechanism for Baler Loading Apparatus," filed Apr. 9, 1976, in the name of Voth, et al., now U.S. Pat. No. 4,034,543. Suffice it to point out, therefore, that the stuffing fork 24 is controlled by a clutch 28 that obtains its driving power from an endless drive chain 30 wrapped about a drive sprocket 32 adjacent the front of the bale case 10. The chain 30 also entrains another sprocket 34 at the top of the bale case 10 that is associated with a second clutch 36 for tying apparatus hereinafter explained and broadly denoted by the numeral 38. When a charge of proper size and density has accumulated within the duct 20, a sensor plate 40 along the bottom thereof opposite the drum 22 is depressed sufficiently to trigger the actuating mechanism 42 associated with the clutch 28, thereby engaging the latter and making the stuffing fork 24 responsive to the input power from the normally constantly moving drive chain 30. At the completion of one stuffing cycle, the fork 24 will be deactivated unless the density of the charge accumulating in the duct 20 in the interim has become great enough to depress plate 40 such as to maintain the clutch 28 fully engaged.

The tying apparatus 38 includes two main components, namely, one or more knotters 44 at the top of the case 10 and one or more needle structures 46 corresponding in number to the knotters 44. The needles 46 are normally disposed in the home or standby position illustrated in FIG. 1, but may be swung to an opposite extreme position as illustrated in FIG. 2, at which time they are fully within the bale chamber 14 in the path of travel of the plunger 16. The function of the needles 46, of course, is to present twine to the knotter 44 for the purpose of completing a binding loop around a compacted bale in the chamber 14, and movement of the needles 46 between the extreme positions of FIGS. 1 and 2 is accomplished by drive means that in part includes the drive chain 30. Other portions of such drive means includes the clutch 36 when the latter is engaged, as well as a push-pull rod 48 that makes a cranked connection with the support 50 for the needles 46 at a point spaced radially from the axis of swinging movement 52 of the support 50. By way of example, the trigger 54 of the clutch 36 is illustrated for actuation by a fore-and-aft extending member 56 that may be coupled with a bale length sensor (not shown) for actuation in response to the bale achieving a predetermined length.

The plunger 16 and the tying apparatus 38 share a common power shaft 58 that extends transversely across the bale case 10 adjacent the front of the latter. Power is transmitted to the plunger 16 from the shaft 58 through a pitman arrangement (not illustrated), while power is transmitted to the tying apparatus 38 and the stuffer fork 24 through the chain 30 and the sprocket 32 in the manner illustrated in detail in FIGS. 3 and 4.

In this respect a hub 60 is keyed to the outer end of the shaft 58 through the key 62 so that the shaft 58 and the hub 60 rotate together as a unit. A bushing 64 is pressed into the sprocket 32 for rotation with the latter, but the bushing 64 rotatably receives the hub 60 such that the composite bushing-plus-sprocket assembly is free to rotate about the hub 60. However, a crank plate 66 laterally outboard of the sprocket 32 is fixed to the hub 60 such as by welding, and a shear bolt 68 rigidly interconnects the plate 66 and the sprocket 32 at a point spaced radially outwardly from the axis of rotation of the shaft 58, thereby drivingly connecting the sprocket 32 with the power shaft 58. The shear bolt 68 thus presents a weak point in the drive train for the apparatus 38 which will fracture and thereby disconnect the apparatus 38 from the power shaft 58 in the event of excessive loading on the apparatus 38.

The hub 60 carries a second crank 70 that is fixed to the hub 60 so that power is always supplied to such second crank 70 regardless of whether or not the shear bolt 68 has severed and thereby disrupted power to the sprocket 32. Crank 70 thus serves as a means for connecting safety control linkage broadly denoted by the numeral 72 to the power shaft 58 independently of the power transmitting connection between the latter and the tying apparatus 38. The linkage 72 includes a long fore-and-aft extending member 74 having a bearing 76 at its forwardmost end that journals a pintle 78 projecting laterally outwardly from the crank 70. On the other hand, the rear end of the member 74 is provided with an elongated loop 80 defining an internal slot 82 which receives a roller projection 84 at the upper end of a lever extension 86 on the needle support 50. As illustrated in FIG. 1, the loop 80 reciprocates between the solid and phantom line positions without effect on the needles 46 when the latter are in their home position, and thus the loop 80, the slot 82 and the projection 84 comprise lost-motion means.

OPERATION

As the baler is advanced along a crop windrow and materials are picked up, loaded into the bale chamber 14 through the duct 20, and intermittently packed rearwardly by the plunger 16, the control linkage 72 reciprocates between the solid and phantom line positions of FIG. 1 without affecting the needles 46 in their illustrated home position. Noteworthy in this regard is that, as illustrated in FIG. 1, when the crank 70 is in its top dead center position with the linkage 72 thus forward to its fullest extent, the rearmost bight portion 80a of the loop 80 is very slightly rearwardly of the projection 84, thus exerting no pulling force against the same.

When the bale reaches a predetermined length so that the clutch 36 is engaged, the tying apparatus 38 will be activated in timed relationship with the plunger 16 and the linkage 72 so as to swing the needles 46 to and from the operated position illustrated in FIG. 2. This, of course, serves to present twine strands to the knotter 44 so that the finished bale will be properly bound.

The relationship between the linkage 72 and the needles 46 is such that as the needles 46 swing upwardly so as to rock the lever 86 rearwardly, the loop 80 is also moving rearwardly to maintain the bight portion 80a out of substantial pulling engagement with the projection 84. And on the return stroke of the needles 46, while the lever 86 swings forwardly, the loop 80 is also moving forwardly to again maintain the bight portion 80a out of substantial force transmitting engagement with the projection 84. Hence, so long as the needles 46 and the linkage 72 remain in proper timed relationship to one another, the linkage 72 has no effect on the needles 46 throughout standby and operation of the latter.

If, however, the shear bolt 68 should for any reason sever or other failure of the drive train to the needles 46 occur during a tying cycle (for example, the clutch 36 could become accidentally disengaged, the rod 48 could break, or any of its points of connection could fail), the linkage 72 will take over and positively withdraw the needles 46 from the bale chamber 14 to their home position. This is illustrated, for example, in FIG. 2, wherein it is shown that if the needles 46 should for any reason tend to remain in their full throw position, the loop 80 must travel forwardly from that position on, pulling with it the lever 86 through engagement of the bight portion 80a with projection 84, thus swinging the needles 46 downwardly to their home position.

Note that once the malfunctioned needles 46 have been fully withdrawn, the linkage 72 has no tendency to return the same back into the chamber 14 since the loop 80 will thereafter only reciprocate freely fore-and-aft without effect on the standby-positioned projection 84.

Throughout all of this, note that the plunger 16 has been totally unaffected. So long as the main input power to the baler, such as from the power takeoff of a towing vehicle, is not interrupted, the plunger 16 will continue to operate. In a similar fashion, the safety control linkage 72 continues in constant readiness so long as the main input power to the baler is not interrupted. This is attributed to the fact that the control linkage 72 and the tying apparatus 38 are independently connected to the power shaft 58 in the manner detailed in FIGS. 3 and 4.

Having thus described the invention, what is claimed as new and desired to be secured by Letters Patent is:

1. In a safety control arrangement for a baler where damage is prevented between the reciprocatory plunger and malfunctioned tying structure left in the path of travel of the plunger during the preceding tying cycle as a result of the drive train for the structure becoming inoperative, the improvement comprising:

means for withdrawing said structure from said path of travel, said withdrawing means including linkage shiftable during each operation of said plunger, which linkage has a lost-motion connection with said structure that is operable to effect said withdrawal when necessary, yet permits the structure to remain idle when it is out of said path of travel between tying cycles notwithstanding said operation of the plunger and said shifting of the linkage.

2. In a safety control arrangement as claimed in claim 1, wherein said lost-motion means includes a projection movable with the structure and a loop for the projection movable with movement of the plunger.

3. In a safety control arrangement as claimed in claim 1, wherein said plunger, said structure and said linkage share a common drive shaft, said linkage being connected to said shaft independently of said structure for continued actuation of the linkage by the shaft notwithstanding disconnection of the structure from the shaft.

4. In a safety control arrangement as claimed in claim 3, wherein said structure is connected to said shaft through a shear bolt.

5. In a safety control arrangement as claimed in claim 1, wherein said structure is mounted for swinging movement during operation thereof.

6. In a baler:

a reciprocatory plunger;

tying apparatus for a bale formed by said plunger and including structure movable into and out of the path of travel of the plunger during each actuation of the apparatus;

drive means for effecting said movement of the structure; and safety control means for withdrawing the structure from said path of travel in the event said drive means should become inoperative during a tying operation, said control means including linkage shiftable during operation of the plunger and coupled with said structure, said linkage including lost-motion means for permitting the structure to remain idle when out of said path of travel between tying cycles notwithstanding continued operation of the plunger.

7. In a baler as claimed in claim 6, wherein said lost-motion means includes a projection movable with said structure and a loop for the projection movable in response to operation of the plunger.

8. In a baler:

a reciprocatory plunger;

tying apparatus for a bale formed by said plunger and including structure movable into and out of the path of travel of the plunger during each actuation of the apparatus;

drive means for effecting said movement of the structure; and safety control means for withdrawing the structure from said path of travel in the event said drive means should become inoperative during a tying operation, said plunger and said structure sharing a common power input shaft, said drive means interconnecting said structure and said shaft, said control means including linkage interconnecting said structure and said shaft independently of said drive means.

9. In a baler as claimed in claim 8, wherein said linkage includes lost-motion means for permitting the structure to remain idle when out of said path of travel between tying cycles notwithstanding continued operation of the plunger.

* * * * *